United States Patent [19]

Garn

[11] 4,218,599
[45] Aug. 19, 1980

[54] POLYMER SPRING

[75] Inventor: Larry W. Garn, Sparta, Mich.

[73] Assignee: Steelcase Inc., Grand Rapids, Mich.

[21] Appl. No.: 855,969

[22] Filed: Nov. 30, 1977

[51] Int. Cl.² ............... H01H 3/12; H01H 39/00; H01H 15/00
[52] U.S. Cl. ............... 200/159 R; 200/340; 292/70; 267/140; 16/86 R; 24/214
[58] Field of Search .......... 200/159 R, 340, 275, 200/61.61, 61.62; 220/85 K, 306, 307; D20/22; 267/140; 292/70, 74; 312/319; 16/86 A, 86 R; 24/73 P, 73 PP, 213 CS, 213 R, 214, 208 A

[56] References Cited

U.S. PATENT DOCUMENTS

| 1,915,249 | 6/1933 | Jorgensen | 16/86 R X |
| 3,168,961 | 2/1965 | Yates | 220/307 |
| 3,424,051 | 1/1969 | Baugh | 24/214 X |
| 3,928,741 | 12/1975 | Comer | 200/159 R |
| 3,932,722 | 1/1976 | Obata et al. | 200/340 |
| 3,940,585 | 2/1976 | Schaad | 200/159 R |

FOREIGN PATENT DOCUMENTS 1444846  8/1976  United Kingdom ............ 24/73 P

Primary Examiner—Steven M. Pollard
Attorney, Agent, or Firm—Price, Heneveld, Huizenga & Cooper

[57] ABSTRACT

This specification discloses a polymer spring including an elongated shank having a first end with a longitudinal slit and an enlarged portion, an integral enlarged head at a second end of the shank opposite from the first end, and an integral, cupped flange for providing a biasing force surrounding the shank and opening toward the first end. Deflection of the flange creates a biasing force tending to cause the flange to return to an undeflected state.

20 Claims, 5 Drawing Figures

POLYMER SPRING

BACKGROUND OF THE INVENTION (1) Field of the Invention

This invention relates generally to spring means; and, more particularly, to an integral, resilient polymer spring.

(2) Prior Art

The prior art teaches a great many types of springs. However, there remains a need for a simple, inexpensive integral spring which can be secured in an aperture, deflected and then returned to its undeflected position. Such a spring is useful in a variety of applications.

First, for example, the spring can be used as a part of a drawer and case or drawer support assembly to insure that when a drawer is closed it does not rebound to a partially open position. The prior art includes the use of a roller attached to the drawer which goes over a ridge in the drawer support assembly and is prevented from rolling back over the ridge by the weight of the drawer and the contents of the drawer. This is a relatively complicated system and relatively expensive. Indeed, such a drawer retaining system may tend to wear out faster than the piece of furniture itself.

Other means of retaining a drawer shut include steel springs attached to each side of the drawer support assembly which apply force to an emboss on the drawer itself. When the drawer is closed, the spring engages the emboss and reduces the drawer rebound. The use of such a steel spring produces undesirable wear on the drawer. Further, there is often an undesirable squeaking noise when the drawer is closed. The expense and noise are undesirable features which it would be desirable to eliminate. A simple, inexpensive, noiseless drawer closing mechanism is desired.

Second, the use of a simple, integral, resilient spring would also be advantageous in such applications as the spring for an electrical contact button. Prior art electrical contact buttons have typically included at least two pieces. For example, a non-conductive external button is coupled to a spring which, when deflected by the button, opens or closes the contact as desired.

SUMMARY OF THE INVENTION

This invention teaches a spring in the form of a simple, relatively inexpensive resilient button. The uses for such a spring include a drawer anti-rebound means and an electrical contact switching button. The button can be secured to a support, and, for example, within an aperture, and resiliently deflected so it is moved toward the support and, for example, within the aperture, by the application of an external force. Upon removal of the external force the button returns to its original position.

The polymer spring is integrally molded of a polymer material and includes an elongated shank with an integral resilient flange means for providing a biasing force. The flange extends radially outwardly with respect to said shank. The polymer spring is molded of a flexible, resilient polymeric material so that deflection of the flange creates a biasing force tending to cause the flange to return to an undeflected state.

These and other aspects, features, objects and advantages of the invention will be more fully understood and appreciated by reference to the written specification and appended drawings.

DESCRIPTION OF THE PREFERRED EMBODIMENT

Figure 1:
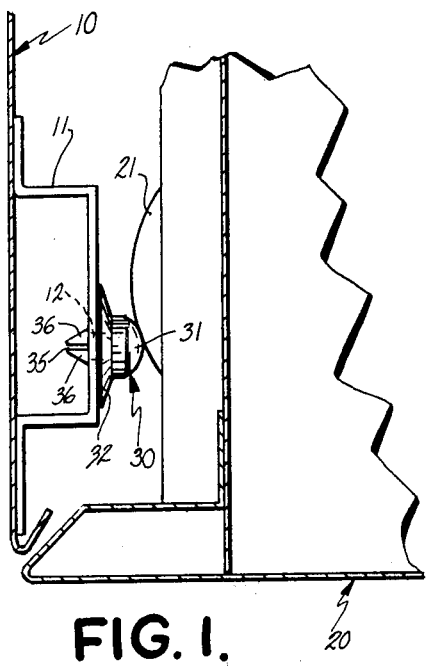
FIG. 1 is a fragmentary sectional view of the front corner of a drawer held within a drawer support and guide structure using the polymer spring of the present invention as an anti-rebound button.

In the preferred embodiment, polymer spring 30 is integrally molded in one piece of a resilient flexible plastic material. The material should have excellent fatigue resistance and in many applications should have a low coefficient of friction. As will be apparent to one skilled in the art, the specific type of plastic used may vary depending on the resiliency, flexibility and durability requirements of a particular application. One preferred plastic is an acetal copolymer. Celanese Celcon M 90-04 is a specific brand which is applicable. Some nylons would also work well.

Polymer spring or button 30 includes an enlarged head 31, a cupped skirt or flange 32, a shank 33 and an enlarged split end 34 on shank 33. Split end 34 comes together to allow one to push button 30 through an aperture. Split end 34 then expands or spreads apart to hold button 30 in the opening. Split end 34 includes a slit 35 and protrusions 36 on either side of slit 35. Protrusions 36 each have a generally arrow-head shape and taper toward the end of split end 34 to facilitate insertion of split end 34 into aperture 12 and resist withdrawal of split end 34 from aperture 12.

Figure 3:
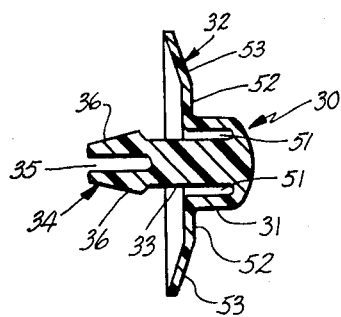
FIG. 3 is a longitudinal sectional view of a polymer spring in accordance with an embodiment.

Cupped skirt 32 is resiliently flexible so that button 30 can be pressed against a surface and will rebound therefrom. Referring to FIG. 3, skirt 32 includes a radially extending portion 52 extending out from the bottom of head 31, at first straight out and then at 53, at an angle to form the cupped shape of skirt 32. Head 31 is relieved from beneath by annular slot 51. This not only saves material, but renders skirt 32 even more resiliently flexible.

FIG. 1 shows polymer spring 30 used as an anti-rebound button for a drawer. A casing 10 of a cabinet or desk is the support for a drawer 20. A polymer anti-rebound button 30 is snapped into position through aperture 12 in a stud 11 on the inside of case 10. Stud 11 protrudes inwardly from a side wall of casing 10 toward drawer 20. Drawer 20 includes an enlarged emboss 21 which, when drawer 20 is closed passes through a position of interference with button 30. Once emboss 21 is pushed inward of button 30, the interference position resists rebound of drawer 20 from casing 10.

When one opens drawer 20, one can readily pull emboss 21 past head 31 since cupped skirt 32 deflects. When one pushes drawer 20 shut, it stays shut because emboss 21 slides past head 31 and head 31 is then pushed away from stud 11 by the biasing action of cupped skirt 32 to thereby hold emboss 21 and accordingly drawer 20 in place.

The anti-rebound button is particularly advantageous because it can be easily snapped into aperture 12 in stud 11. The flexing of cupped skirt 32 reduces wear on drawer 20 and on button 30, and further, when it is made of a material such as polymer, for example nylon, there is substantially noiseless operation with no squeaking between drawer 20 and button 30. Still further, button 30 can effectively function as an anti-rebound device even when there is a relatively great degree of variation from the desired dimensions of button 30. Flexible skirt 32 takes up the slack. That is, a greater tolerance can be permitted and still have satisfactory anti-rebound operation. This ability to allow greater tolerance lowers manufacturing costs and simplifies manufacturing.

Figure 2:
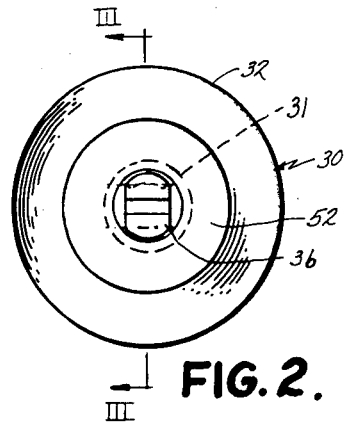
FIG. 2 is a bottom plan view of a polymer spring in accordance with an embodiment of this invention.
Figure 5:
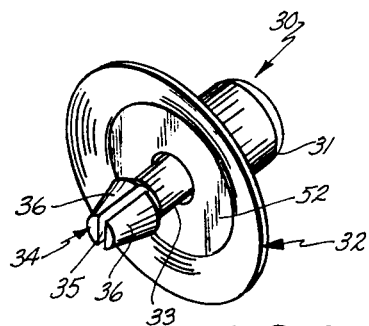
FIG. 5 is a perspective view of the polymer spring shown in FIGS. 2 and 3.

Referring to FIGS. 2, 3, and 5, typical dimensions for button 30 include a longitudinal length of about 0.295" from the base extremity of skirt 32 to the top extremity of head 31. Skirt 32 has a sufficient longitudinal depth so that head 31 can clear emboss 21 when there is an interference position or overlap of about 0.0521".

In order for member 30 to have spring characteristics, flange skirt 32 must be significantly larger in diameter than that portion of member 30 to which it is connected. In the preferred embodiment, the diameter of flange 32 is about 5 times as great as that of shank 33 and about 2.7 times as great as that of head 31. The minimum ratio of the diameter of the skirt 32 to that of the portion of button 30 to which it is connected and therefor from which it flexes should probably be at least about 2 to 1. Typical dimensions for button 30 further include a thickness of about 0.028" for cupped skirt 32; a width of about 0.040" for slit 35 in split end 34; a diameter of about ¾" for cupped skirt 32; a diameter of about 9/32" for head 31; and a diameter of about 0.140" for shank 33.

Figure 4:
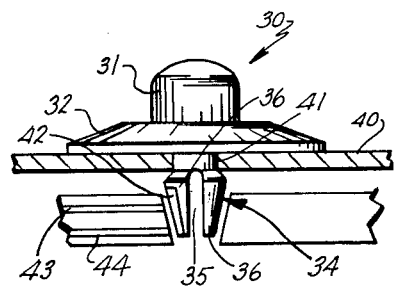
FIG. 4 is a partial sectional side elevation view of a polymer spring in accordance with an embodiment of this invention for use as an electrical connector.

Referring to FIG. 4, button 30 is shown as an electrical contact button. It is mounted on a support 40 having therein an aperture 41 for passing shank 33. Slit 35 is sufficiently wide so that when protrusions 36 of split end 34 are pressed toward each other, split end 34 is sufficiently narrow to pass through aperture 41. As shown, at least one of the protrusions 36 has a conductive coating 42 which makes contact with conductors 43 and 44 when button 30 is depressed. That is, as flange or skirt 32 deflects, protrusions 36 are lowered. As a result, conductive coating 42 need not have any spring in it and the spring action of button 30 is substantially provided by skirt or flange 32. Since conductive coating 42 need not flex, there is substantially no tendency for conductive coating 42 to crack and to interrupt a conductive path between conductors 43 and 44. It can of course be appreciated that button 30 can be used to make electrical contact by other means such as, for example, positioning split end 34 above conductor 43 so that depressing button 30 causes conductor 43 to bend and thus to contact conductor 44.

Various modifications and variations will occur to those skilled in the art to which this invention pertains. For example, the particular shape of skirt 32 or protrusions 36 may be varied from that disclosed herein. An example would be to have radially protruding spokes instead of a circumferentially continuous member. Further, the circumference of the portion of shank 33 which passes through the aperture can be varied by means other than a longitudinal slit. Such means include a hollow core within shank 33 or an easily compressed annular ring around shank 33. The annular ring would compress when shank 33 is pressed through an aperture yet provide sufficient resistance so the button cannot fall out of the aperture. These and all other variations which basically rely on the teachings through which this disclosure has advanced the art are properly considered within the scope of this invention as defined by the appended claims.

The embodiments of the invention in which an exclusive property or privilege is claimed are defined as follows.

1. An electrical contact switching device comprising:
    a support board for supporting a switch button;
    an aperture in said board;
    electrical contacts on one side of said board adjacent said aperture;
    an integrally molded polymer contact button including a shank projecting through said aperture, conductive means on said shank adjacent said electrical contacts; said shank having a first end with an adjustment means for reducing the circumference of said first end for passage through said aperture and for increasing the circumference of said first end for resisting removal from said aperture; said shank including an integral head at a second end of said shank, opposite said first end, said head being located on the same side of said support board as said integrally molded flange means whereby said head serves as the point at which pressure is applied to said electrical contact button; and
    integral resilient flange means of a cupped configuration with the cup opening towards said support board and projecting radially relative to said shank and engaging said support board on the side thereof opposite said electrical contacts; said polymer contact button being molded of a flexible resilient polymeric material so that deflection of said flange means creates a biasing force tending to cause said flange to return to an undeflected state whereby one can close a circuit through said electrical contacts by depressing said polymer contact button and open said circuit by releasing pressure on said polymer contact button; said flange means being attached to the periphery of said head and a portion of said head extending along, spaced from and generally parallel to said shank thereby forming an annular opening between said shank and said portion of said head, and said flange means extending generally radially outwardly from the bottom of said head and at least partially toward said adjustment means so that said flange means can be deflected away from said adjusting means and a biasing force created tending to move said contact button so that said flange is in an undeflected state.

2. The apparatus of claim 1 wherein said polymer contact button is formed of an acetal copolymer.

3. The apparatus of claim 1 wherein said first end of said shank includes an enlarged portion which extends radially outward of the circumference of an undeflected shank and lies within the circumference of the undeflected shank when said shank is in a deflected state, said enlarged portion being generally tapered toward the extremity of said first end so as to facilitate insertion of said polymer contact button into said aperture and resist removal from said aperture.

4. The assembly of claim 3 wherein said adjustment means includes a longitudinal split in said first end and an enlarged portion of said shank adjacent said longitudinal split so that portions adjacent said split can be compressed toward each other for passage through said aperture, said first end of said shank being sized so as to be larger than said aperture when said shank is undeflected.

5. A polymer spring including:

an enlongated shank having a first end with an adjustment means for reducing the circumference of said first end for passage through an aperture and for increasing the circumference of said first end for resisting removal from the aperture, and having an integral head at a second end of said shank, opposite from said first end;

an integral resilient flange means for providing a biasing force, said flange extending radially outward with respect to said shank; and said polymer spring being molded of a flexible, resilient, polymeric material so that deflection of said flange creates a biasing force tending to cause said flange to return to an undeflected state; said flange being attached to the periphery of said head and a portion of said head extending along, spaced from and generally parallel to said shank thereby forming an annular opening between said shank and said portion of said head, and said flange extending generally radially outward from the bottom of said head and at least partially toward said adjustment means so said flange can be deflected away from said adjustment means and a biasing force created tending to move said spring so said flange is in a undeflected state.

6. A polymer spring as recited in claim 5 wherein said spring is formed of an acetal copolymer.

7. The polymer spring of claim 6 in which said shank includes conductive means thereon whereby said polymer spring can be used as an electrical contact button.

8. A polymer spring as recited in claim 5 wherein said first end of said shank includes an enlarged portion which extends radially outward of the circumference of an undeflected shank and lies within the circumference of the undeflected shank when said shank is in a deflected state, said enlarged portion being generally tapered toward the extremity of said first end so as to facilitate insertion of said polymer spring into the aperture and resist removal from the aperture.

9. The polymer spring of claim 5 in which said shank includes conductive means thereon whereby said polymer spring can be used as an electrical contact button.

10. In a case and drawer assembly, an anti-rebound means for a drawer for preventing rebound when the drawer is closed, said anti-rebound means comprising:

a polymer spring secured to one of said case and drawer along a longitudinal side of said drawer and a projecting detent on the other of said case and drawer for cooperating with said polymer spring; said polymer spring including integral head means contacting said detent when aligned therewith and integral flange means for providing a biasing force, said flange means extending radially outward relative to said head means and engaging said case, polymer spring being made of a resilient material so that deflection of said flange means creates a biasing force on said polymer spring tending to cause said flange means to return to an undeflected state, said detent being behind said polymer spring when said drawer is closed whereby the engagement of said polymer spring by said detent tends to hold said drawer closed, said detent abutting said head means and deflecting said flange means when said drawer is opened or closed to allow said detent to move past said polymer spring.

11. The assembly of claim 10 in which said flange means is cup-shaped, with said cup opening away from said head.

12. The assembly of claim 11 in which said polymer spring includes a shank integrally molded with said head means extending therefrom and being secured to said case.

13. The assembly of claim 12 in which said shank includes coupling means at an end opposite said head means for coupling with said case.

14. The assembly of claim 13 in which said case includes an aperture therein and said coupling means comprises an enlarged end inserted in said aperture, said enlarged end including a slit therein whereby it can be compressed to facilitate insertion into said aperture.

15. The assembly of claim 14 in which said polymer spring is made of an acetal copolymer.

16. The assembly of claim 10 in which said polymer spring includes a shank integrally molded with said head means extending therefrom and being secured to said case.

17. The assembly of claim 16 wherein said flange means is integrally attached to said spring adjacent said head and is generally cup-shaped surrounding said shank; said head includes a portion extending along, spaced from and generally parallel to said shank thereby forming an annular opening between said shank and said head portion, and said flange means extending generally radially outward from the termination of said head portion and at least partially toward said first end of said shank so said flange means can be deflected away from said adjustment means and a biasing force created tending to move said spring so said flange means is in an undeflected state.

18. The assembly of claim 17 wherein said shank includes an aperture and said elongated shank has a first end with an adjustment means for reducing the circumference of said first end for passage through said aperture and for increasing the circumference of said first end for resisting removal from said aperture.

19. The assembly of claim 18 wherein said adjustment means includes a longitudinal split in said first end and an enlarged portion of said shank adjacent said longitudinal split so that portions adjacent said split can be compressed toward each other for passage through said aperture, said first end of said shank being sized so as to be larger than said aperture when said shank is undeflected.

20. The assembly of claim 19 wherein said shank and said head have a generally circular transverse cross-section, said head is enlarged with respect to said shank, said flange means extends radially outward beyond the periphery of said head and toward said first end a sufficient distance to permit sufficient movement of said head so that said emboss can pass said enlarged head.

* * * * *